United States Patent Office 3,553,728
Patented Jan. 5, 1971

3,553,728
FREQUENCY MEASURING APPARATUS WITH AUTOMATIC ADJUSTMENT OF MEASUREMENT INTERVAL FOR ENHANCED SPEED AND ACCURACY
Richard W. Frank, Stow, Robert G. Fulks, West Concord, and James K. Skilling, Harvard, Mass., assignors to General Radio Company, West Concord, Mass., a corporation of Massachusetts
Filed May 20, 1968, Ser. No. 730,430
Int. Cl. G01r 23/02
U.S. Cl. 324—78
8 Claims

ABSTRACT OF THE DISCLOSURE

This disclosure deals with automatically adaptive counter apparatus, as for frequency measurements, in which an arithmetic reciprocator is employed such that with the counter clock limited in frequency only by the maximum counting decade resolution, the clock will fill the counting registers at the maximum possible speed to any desired number of significant figures, with the answer preferably always presented as frequency.

---

The present invention relates to automatically adaptive counter apparatus, being more specifically directed in preferred aspects, to fully automatic decade counters in which the counter automatically operates as fast as possible to obtain the desired number of significant figures indicated by the operator.

Many counter specifications are written for frequency and for frequency accuracy. Counters measuring low frequencies, however, must either take an unconscionably long time or make the measurement in terms of the period of the unknown frequency. While it would be desirable to have a fast measurement using period techniques with the answer displayed as frequency, accuracy requires more digits than a simple conversion of the digital data into analog form will permit. Apparatus has been proposed, however, which measures the period and calculates the frequency digitally. Such a system is not automatic, however, but requires the operation of a manual range switch.

It has, indeed, been previously thought necessary for a counter to decide between period and frequency measurement in different ranges and then make the appropriate choice of programs for minimum time.

In accordance with the present invention, however, it has been found that through the appropriate use of a reciprocating arithmetic unit, it becomes possible to provide a completely automatic counter that is merely set to the desired number of significant figures by the operator and that, by its program design, simply produces the significant figures as rapidly as possible, with the answer always in frequency. In summary, assuming that the counter has an internal clock limited in frequency only by the maximum counting decade resolution, the clock will then fill the registers at the maximum possible speed to any desired number of significant figures, the reciprocator being a key to the fastest possible counter.

An object of the invention, accordingly, is to provide a novel automatic counter.

Other and further objects will be explained hereinafter and are more particularly pointed out in the appended claims.

Figure 1:
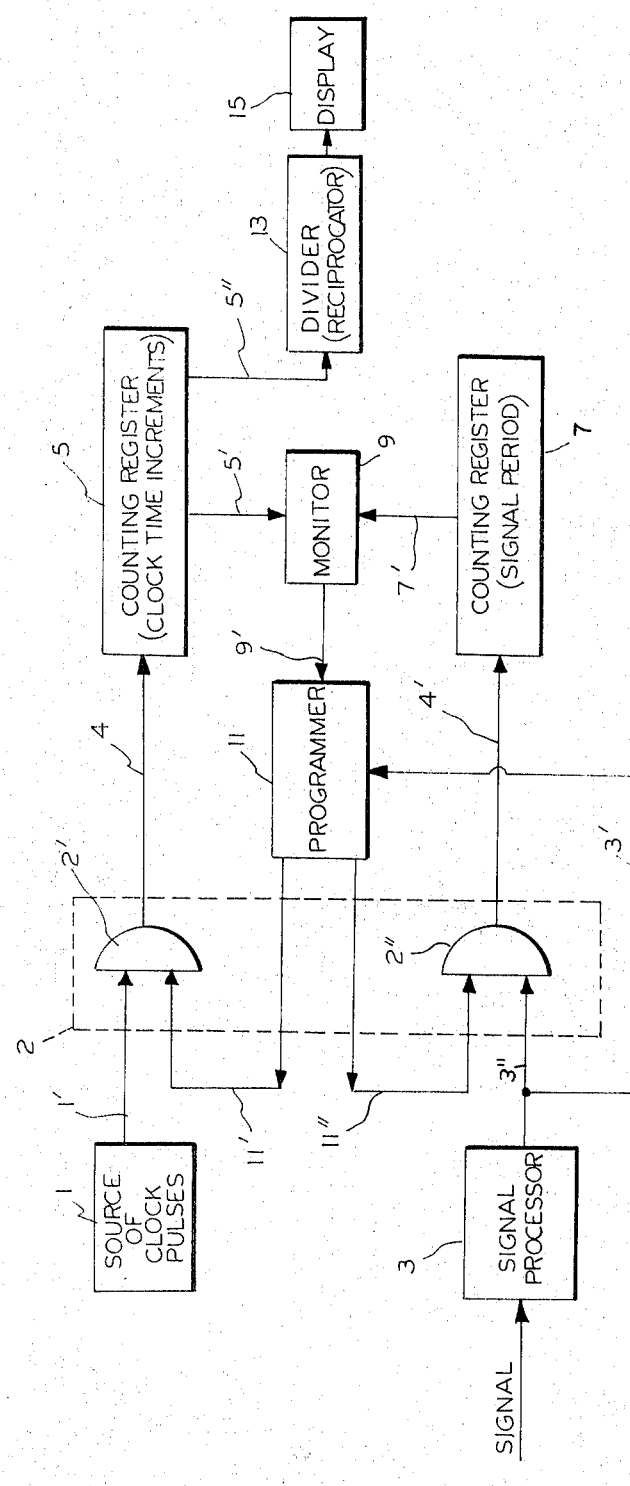
Figure 2:
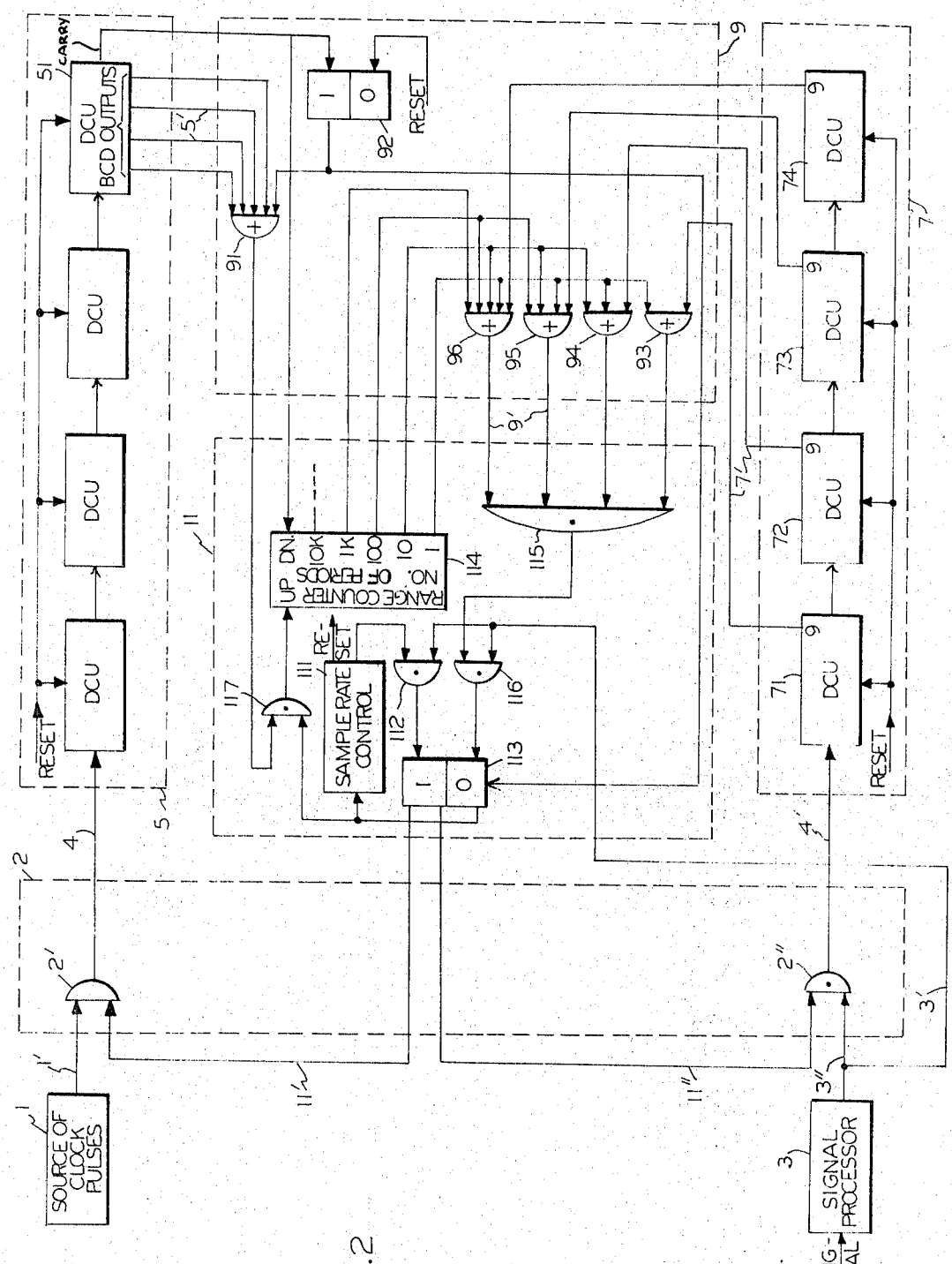
Figure 3:
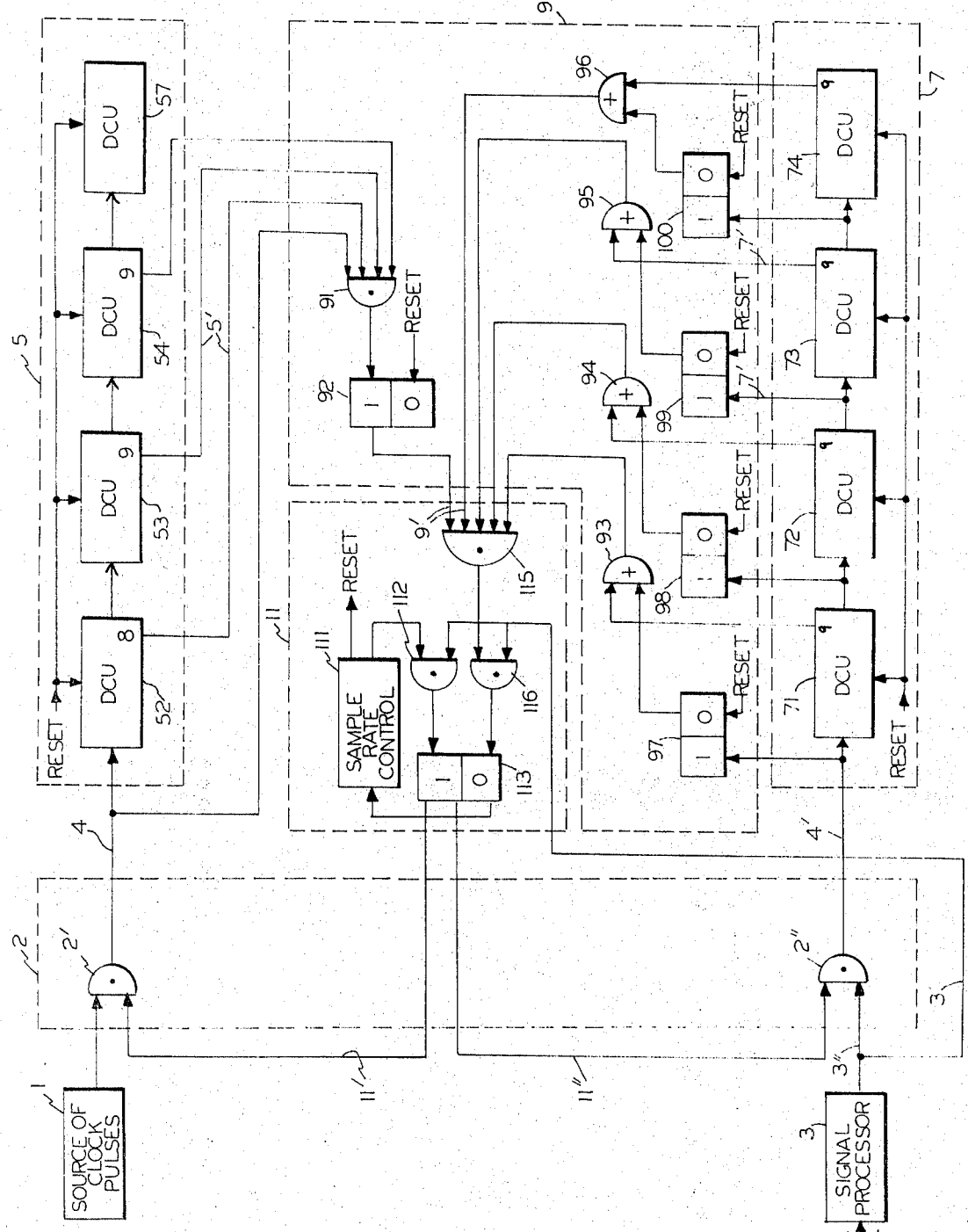

The invention will now be described with reference to the accompanying drawings, FIG. 1 of which is a simplified block diagram of a system embodying the principles of the invention in preferred form; and FIGS. 2 and 3 are more detailed diagrams of specific forms of the system of FIG. 1.

Referring to FIG. 1, the apparatus is shown comprising a pair of counting registers 5 and 7, connected to receive inputs along respective conductor lines 4 and 4' from a pair of gates 2' and 2" of a gating circuit schematically represented at 2. The inputs to the gate 2' are applied at 1' from a source of clock pulses 1, and 11' from a programmer 11; with inputs to the gate 2" fed at 3" from a signal processor circuit 3, and at 11" from the programmer 11. The programmer 11 is controlled from the signal processor output fed by conductor 3'.

The signal processor 3 is designed to produce one pulse for each cycle of the signal the periods of which are to be measured. These pulses must have a uniform relation in time to the zero or other axis crossings of the signal; and it is usually most advantageous that they occur near one of the zero crossings, as later discussed.

The counting registers 5 and 7, respectively registering clock time increments and signal periods, are monitored by a monitor circuit 9 to which they are connected at 5' and 7'; and the register 5 has its output 5" applied to a divider or arithmetic reciprocator circuit 13 which feeds any desired output indicator or utilizing device, generically illustrated and termed as a "display" 15 (the reciprocator and display not being indicated in FIGS. 2 and 3 for simplicity, but being intended therein). The display 15, of course, as a result of the reciprocating action at 13, may indicate frequency.

In operation, the signal periods of the signal fed from the processor source 3 are to be measured. The registers 5 and 7 respectively accumulate counts of the clock pulses from the clock source 1 and the signal periods from the signal source 3 fed along the output circuits 4 and 4' of the gate circuit 2. The programmer 11, as a result of its connections at 11' and 11" with the gate circuit 2, controls the commencement and duration of the period measurement under the further control of the output 9' from the monitor circuit 9. The output at 9', in turn, indicates the degree of filling of the registers 5 and 7. As will later be more evident from a consideration of the specific configurations of FIGS. 2 and 3, the clock will enable the filling of the registers at the maximum possible speed to any desired number of significant periods, with the answer always in period.

Turning, now, to the specific illustrative embodiment of FIG. 2, it should be recognized that in computing a reciprocal of a number, with a given register capacity, the divisor register must be nearly full or else the accuracy of the computation suffers drastically and the time taken is relatively long. The technique represented by the embodiment of FIG. 2 assumes that the next measurement made will probably be similar to the last made measurement and checks the divisor register to see that it is nearly full. If such is not the case, the range is automatically changed, the contents of the register erased, and an entirely new measurement made, as hereinafter explained.

Before the start of measurement, the counting registers 5 and 7 are reset to zero by a pulse from a sample rate control 111 within the programmer 11. The measurement starts when the sample rate control 111 enables a gate 112, allowing a signal pulse on line 3' to set the programmer flip-flop 113 to its "1" state. This enables gates 2' and 2" of the gate circuit 2 (via conductor lines 11' and 11"), so that clock pulses are applied at 4 to counting register 5 and signal pulses are applied at 4' to counting register 7. The gates remain open until the number of signal pulses determined by a range counter or up-down shift register 114 of the programmer 11 has been counted. Gate 115 is then enabled by the outputs 9' of the monitoring means 9 which in turn enables gate 116, allowing a signal pulse on line 3' to reset flip-flop 113 to its "0" state. This closes gates 2' and 2", ending the measurement.

If at the end of the measurement, the last decade counting unit ("DCU") 51 of counter register 5 has not counted any pulses, there will be no output from gate 91 in the monitoring circuit 9. This will enable gate 117 in the programmer 11, allowing a pulse from flip-flop 113 to be applied to the "up" input of the range counter 114, so that the next measurement will be made at the next higher decade range. If, however, the last decade counting unit 51 of the register 5 counts more than nine pulses, the carry (spill) pulse is applied to the "down" input of the range counter 114, so that the next measurement will be made at the next lower decade range.

The carry pulse from decade 51 also sets the monitor flip-flop 92 to its "1" state, which in turn resets the programmer flip-flop 113 to its "0" state, closing gates 2' and 2". The "1" state of flip-flop 92 also enables gate 91, thereby preventing a false "up" pulse from being applied to the range counter or up-down shift register 114.

The range counter 114 is shown with five outputs which are assumed to be energized one at a time, as in a ring counter. When the "1" line is energized, monitor gates 93, 94, 95 and 96 are enabled so that programmer gates 115 and 116 are enabled at all times. This will cause the programmer flip-flop 113 to be triggered by successive signal pulses, giving a one-period measurement. When the "10" line of the programmer range control 114 is energized, gates 94, 95 and 96 are enabled, but gate 93 will not be enabled until the left-most decade counting unit (DCU) 71 of the register 7 has counted nine signal pulses. Gates 93, 115 and 116 will then be enabled and the tenth signal pulse will reset programmer flip-flop 113, closing gates 2' and 2" and giving a ten-period measurement. The "100" line enables gates 95 and 96. Gates 93 and 94 will not then be enabled until the two left-most decade counting units (DCU) 71 and 72 have counted 99 signal pulses. The measurement will then terminate with the one hundredth pulse. In a similar manner, measurements of one thousand ("1K") and ten thousand ("10K") periods may be obtained. By using more decade counting units, moreover, and a larger capacity range counter, more ranges can be obtained.

Other techniques for controlling the measurement duration may also be employed, as may other types of circuits for setting the said duration and automatically varying the same in accordance with the monitoring of the counting registers. Thus, as another example, in the embodiment of FIG. 3, a somewhat faster-acting configuration is illustrated in which, unlike the system of FIG. 2, the input register is monitored and, as it fills, is automatically stopped when nearly full, as later made more evident.

Referring, thus, to FIG. 3, before the measurement starts, the counting registers 5 and 7 are reset to zero by a reset pulse produced by the programmer sample rate control 111 which then enables gate 112, as in the system of FIG. 2. This allows a signal pulse on line 3' to set the programmer flip-flop 113 to its "1" state, enabling gates 2' and 2" and thereby starting the measurement and applying clock pulses to counting registers 5 and signal pulses to counting register 7. Counting continues until decade counting units (DCU) 52, 53 and 54 of the register 5 have counted 998 clock pulses. The 999th clock pulse then passes through monitor gate 91 and sets the monitor flip-flop 92 to its "1" state. If a signal has not yet been counted by register 7, further monitor flip-flops 97, 98, 99 and 100 (one corresponding to and connected at 7' with the respective decade counter units DCU 71, 72, 73 and 74 of the register 7) will all be in the "0" state and their corresponding gates 93–96 will all be enabled. The output of gates 93–96 together with flip-flop 92 enables programmer gates 115 and 116, allowing the first signal pulse to reset programmer flip-flop 113 to its "0" state and terminate measurement after one period.

If one signal pulse has been already counted but less than nine, the left-most monitor flip-flop 97 will be in its "1" state. Its gate 93 will not then be enabled until nine signal pulses have been counted. The tenth signal pulse will then terminate the measurement, giving a ten-period measurement.

If ten signal pulses have been counted, but less than 99, the left-hand monitor flip-flops 97 and 98 will be in the "1" state and their gates 93 and 94 will not then be enabled until corresponding left-hand decade counting units 71 and 72 of register 7 have counted 99 signal pulses. The one hundredth signal pulse terminates the measurement, giving a 100-period measurement. Similarly, 1000 or 10,000 period measurements may be obtained, the number being determined by the number of periods counted during the first 999 clock intervals. As with the system of FIG. 2, this circuit can also be extended by adding more decade counting units and associated elements.

Suitable conventional circuits for use in the systems of FIGS. 1 through 3 are as follows: decade counting registers 5 and 7 of the type described, for example, in General Radio Experimenter, vol. 35, No. 5, May 1961, commencing with p. 6; "and" gates 2', 2", etc. of the type described, for example, in "Pulse and Digital Circuits" by Millman and Taub, McGraw-Hill, 1956, p. 398; programmer rate control or display-time circuit 111 of the type described, for example, on pp. 14 and 15 of the said Experimenter article; and signal processor 3 of the type described at p. 9 of the said Experimenter article; and "or" gates 93, 94, etc. of the type described on p. 394 of said Millman and Taub text; range control circuit or up-down shift register 114 of the type described in "High Speed Computing Devices" by Engineering Research Associates, Inc., McGraw-Hill, 1950, pp. 297–9; and divider or reciprocator 13 of the type, for example, described in The Logic of Computer Arithmetic, Ivan Flores, Prentice Hall, 1963, pp. 137–143.

Further modifications will occur to those skilled in this art and all such are considered to fall within the spirit and scope of the invention as defined by the appended claims.

What is claimed is:

1. Automatically adaptive counter apparatus having, in combination, a signal processor which produces one pulse for each cycle of the signal, periods of which are to be measured, said pulses having a uniform time relation to the axis crossings of said signal, a source of clock pulses, gating means connected with the output of the signal processor and the source of clock pulses and having output circuit means, a plurality of counting registers connected with said output circuit means to accumulate counts of said clock pulses and signal periods, programming means connected with the gating means and signal processor for controlling the commencement and duration of the period measurement, monitoring means connected with the counting registers for indicating the degree of filling of the same, and means for connecting the monitoring means with the programming means to control the said measurment duration.

2. Apparatus as claimed in claim 1 and in which arithmetic dividing means is connected to at least one of the counting registers to provide a measure of the frequencies corresponding to the said signal periods.

3. Apparatus as claimed in claim 1 and in which the programming means is provided with means for setting the said duration of the measurement, and the monitoring means is provided with means for automatically varying said duration in accordance with the monitoring of the counting registers.

4. Apparatus as claimed in claim 1 and in which said programming means comprises sample rate control means for commencing said measurement and range counter means for controlling said monitoring means to terminate said measurement.

5. Apparatus as claimed in claim 4 and in which programmer flip-flop means is interposed between said sample rate control and range counter means.

6. Apparatus as claimed in claim 4 and in which said monitoring means comprises further flip-flop means connected with the clock-pulse-accumulating counting register to receive a carry pulse therefrom to reset the programmer flip-flop means.

7. Apparatus as claimed in claim 1 and in which each of said counting registers comprises a plurality of successive decade counting units.

8. Apparatus as claimed in claim 7 and in which said monitoring means comprises a plurality of flip-flops, one corresponding to and connected with each decade counting unit of the signal period counting register, and means for causing different numbers of said flip-flops to be automatically selected depending upon whether the number of signal pulses counted is more than the lowest number of the corresponding decade counting unit but not yet a full count thereof, the advent of the filling signal pulse terminating said measurement.

References Cited

UNITED STATES PATENTS 3,312,813   4/1967   Vincent et al. _____ 324—68CX

ALFRED E. SMITH, Primary Examiner

U.S. Cl. X.R.

235—197